(12) United States Patent
Rai et al.

(10) Patent No.: US 8,982,378 B2
(45) Date of Patent: Mar. 17, 2015

(54) METHODS AND SYSTEMS FOR ANALYZING THE IMPACT OF MACHINE FAILURE DATA ON A PRINT SHOP

(71) Applicant: Xerox Corporation, Norwalk, CT (US)

(72) Inventors: Sudhendu Rai, Fairport, NY (US); Marc Dennis Daniels, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 31 days.

(21) Appl. No.: 13/686,194

(22) Filed: Nov. 27, 2012

(65) Prior Publication Data

US 2014/0146339 A1 May 29, 2014

(51) Int. Cl.
 *G06K 15/00* (2006.01)
 *G06F 11/07* (2006.01)

(52) U.S. Cl.
 CPC .................. *G06F 11/0733* (2013.01)
 USPC ......... 358/1.14; 358/1.15; 702/179; 702/180; 702/181; 702/182; 702/183; 702/184; 702/185

(58) Field of Classification Search
 None
 See application file for complete search history.

(56) References Cited

U.S. PATENT DOCUMENTS

| | | | | |
|---|---|---|---|---|
| 5,740,429 A * | 4/1998 | Wang et al. | ............................. | 1/1 |
| 6,547,365 B1 * | 4/2003 | Alberto et al. | .................. | 347/19 |
| 7,903,844 B2 * | 3/2011 | Satonaga et al. | ............. | 382/112 |
| 8,111,417 B2 * | 2/2012 | Rai et al. | ...................... | 358/1.15 |
| 8,164,777 B2 | 4/2012 | Rai et al. | | |
| 8,494,826 B2 * | 7/2013 | Richards et al. | .................. | 703/7 |
| 2003/0123077 A1 * | 7/2003 | Siegel et al. | ................. | 358/1.14 |
| 2003/0149747 A1 * | 8/2003 | Rai et al. | ........................ | 709/219 |
| 2004/0181712 A1 * | 9/2004 | Taniguchi et al. | .............. | 714/47 |
| 2005/0027486 A1 * | 2/2005 | Kitada et al. | .................. | 702/185 |
| 2005/0065830 A1 * | 3/2005 | Duke et al. | ........................ | 705/7 |
| 2006/0168475 A1 * | 7/2006 | Segers et al. | .................... | 714/25 |
| 2007/0091355 A1 * | 4/2007 | Rai | ............................. | 358/1.15 |
| 2007/0280706 A1 * | 12/2007 | Yasukawa et al. | ................. | 399/8 |
| 2008/0068639 A1 * | 3/2008 | Satoh et al. | .................. | 358/1.14 |
| 2008/0144084 A1 * | 6/2008 | Rai | ............................. | 358/1.15 |
| 2008/0188973 A1 * | 8/2008 | Filev et al. | .................... | 700/110 |
| 2009/0128856 A1 * | 5/2009 | Rai et al. | ...................... | 358/1.15 |

(Continued)

OTHER PUBLICATIONS

David Kappos, Subject Matter Eligibility of Computer Readable Media, US Patent and Trademark Office, Feb. 23, 2010, 1351 OG 212.*

(Continued)

*Primary Examiner* — King Poon
*Assistant Examiner* — Ted Barnes
(74) *Attorney, Agent, or Firm* — Fox Rothschild LLP

(57) ABSTRACT

A method of analyzing failures of a print device may include receiving failure information associated with a print device in a print shop. The failure information may pertain to a plurality of failures experienced by the print device over a period of time. The method may include generating, by a computing device, failure distribution information by, for each pair of consecutive failures in the failure information, determining a time to failure between the pair of consecutive failures, determining a repair time associated with each failure in the pair of consecutive failures, and setting the determined times to failure and the determined repair times as the failure distribution information. The method may include performing, by the computing device, a simulation of processing of one or more print jobs by the print device using the failure distribution information, and displaying one or more results of the simulation to a user.

17 Claims, 5 Drawing Sheets

(56) References Cited

U.S. PATENT DOCUMENTS

| | | |
|---|---|---|
| 2009/0187795 A1* | 7/2009 | Doverspike et al. ............ 714/43 |
| 2010/0097653 A1* | 4/2010 | Rai et al. ...................... 358/1.15 |
| 2011/0106734 A1* | 5/2011 | Boult et al. ..................... 706/12 |
| 2011/0134451 A1* | 6/2011 | St. Jacques et al. ......... 358/1.13 |

OTHER PUBLICATIONS

Banks et al., "Discrete-Event System Simulation", Fourth Edition, Prentice Hall International Series in Industrial and Systems Engineering 2010.

\* cited by examiner

| ARRIVE DATE TIME | RESPONSE TIME | INITIAL CALL DATE TIME | DEPART DATE TIME | DOWNTIME (h) | FIRST ARRIVE DATE TIME | DESCRIPTION | PARTS NO. | PARTS QTY. | PROBLEM | TARGET RESPONSE TIME | TOTAL METER |
|---|---|---|---|---|---|---|---|---|---|---|---|
| 10/13/2011 14:50 | 2.000 | 10/13/2011 14:50:00 | 10/13/2011 15:20:00 | 0.500 | 10/13/2011 14:50:00 | COROTRON ASSY | 125K93656 | 1 | BROKEN PART | 2.000 | 116049 |
| 10/12/2011 18:30 | 2.000 | 10/12/2011 18:25:00 | 10/12/2011 18:50:00 | 0.333 | 10/12/2011 18:30:00 | LAMP FSR | 122E92640 | 8 | LIGHT IMAGE | 2.000 | 115258 |
| 10/13/2011 23:30 | 2.000 | 10/13/2011 23:25:00 | 10/13/2011 23:50:00 | 0.333 | 10/13/2011 23:30:00 | FILTER ASSY KI | 053K92781 | 1 | FEATURES ELECT | 2.000 | 116359 |
| 10/19/2011 19:54 | 2.000 | 10/19/2011 18:41:00 | 10/19/2011 20:35:00 | 1.900 | 10/19/2011 19:54:00 | CLNR ASY KIT B | 042K94340 | 4 | CONTROL FAILURE | 2.000 | 122777 |
| 10/24/2011 8:25 | 2.000 | 10/24/2011 07:56:00 | 10/24/2011 11:35:00 | 3.650 | 10/24/2011 08:25:00 | BELT | 023E26340 | 1 | BROKEN PART | 2.000 | 125258 |

FIG. 3

METHODS AND SYSTEMS FOR ANALYZING THE IMPACT OF MACHINE FAILURE DATA ON A PRINT SHOP

BACKGROUND

Machines, such as print devices, may fail due to a variety of reasons. Failures can sometimes keep machines out of commission for several hours before they are repaired. In production or service environments where failure to comply with production or service requirements within an allocated time period can lead to penalties, the ability to reduce the impact of such failures and downtime associated with the failures is desirable.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of analyzing failures of a print device may include receiving failure information associated with a print device in a print shop. The failure information may pertain to a plurality of failures experienced by the print device over a period of time. The method may include generating, by a computing device, failure distribution information by, for each pair of consecutive failures in the failure information, determining a time to failure between the pair of consecutive failures, determining a repair time associated with each failure in the pair of consecutive failures, and setting the determined times to failure and the determined repair times as the failure distribution information. The method may include performing, by the computing device, a simulation of processing of one or more print jobs by the print device using the failure distribution information, and displaying one or more results of the simulation to a user.

In an embodiment, a system of analyzing failures of a print device may include a computing device and a computer-readable storage medium in communication with the computing device. The computer-readable storage medium may include one or more programming instructions that, when executed, cause the computing device to receive failure information associated with a print device in a print shop. The failure information may pertain to a plurality of failures experienced by the print device over a period of time. The computer-readable storage medium may include one or more programming instructions that, when executed, cause the computing device to generate failure distribution information by, for each pair of consecutive failures in the failure information, determining a time to failure between the pair of consecutive failures, determining a repair time associated with each failure in the pair of consecutive failures, and setting the determined times to failure and the determined repair times as the failure distribution information. The computer-readable storage medium may include one or more programming instructions that, when executed, cause the computing device to perform a simulation of processing of one or more print jobs by the print device using the failure distribution information, and display one or more results of the simulation to a user.

In an embodiment, a method of analyzing failures of a plurality of print devices may include receiving failure information associated with a plurality of print devices in a print shop. The failure information may pertain to a plurality of failures experienced by the print devices over a period of time. The method may include generating, by a computing device, failure distribution information associated with each print device in the plurality of print devices by, for each pair of consecutive failures in the failure information, determining a time to failure between the pair of consecutive failures, determining a repair time associated with each failure in the pair of consecutive failures, and setting the determined times to failure and the determined repair times as the failure distribution information. The method may include performing, by the computing device, a simulation of processing of one or more print jobs by the print devices using the failure distribution information associated with the print devices, and displaying one or more results of the simulation to a user.

BRIEF DESCRIPTION OF THE DRAWINGS

FIG. 3 illustrates an example of a service log according to an embodiment.

DETAILED DESCRIPTION

The following terms shall have, for purposes of this application, the respective meanings set forth below:

An "autonomous cell" refers to one or more print devices in a print shop that are capable of processing at least a portion of a print job.

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

A "failure" refers to an event that causes partial or complete cessation of operation of a print device. Examples of failures may include, without limitation, power outages, equipment failure, device overload, paper jams, overheating and/or the like.

A "job" refers to a logical unit of work that is to be completed for a customer. A job may include one or more print jobs from one or more clients. A production system may include a plurality of jobs. Although the disclosed embodiments pertain to document production systems, the disclosed methods and systems can be applied to production systems in general.

A "meter read" refers to a number of pages processed by a print device at a particular time. For example, two minutes into processing a print job having 1,452,876 pages may have a meter read value of 32,784 pages. Additional and/or alternate meter read values may be used within the scope of this disclosure.

A "print job" refers to a job processed in a print shop. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "print device" refers to a computing device capable of performing one or more functions, operations and/or services on a print job. For example, a print device may provide print-related services for one or more print jobs. A print device may include a printer, multi-function device or other similar equipment that is capable of printing an image on physical media, such as, for example, paper, vinyl, labels and/or the like.

A "service log" refers to a record of maintenance, repair or other services performed on one or more print devices.

A "time to failure" is a unit of measurement between consecutive failures experienced by a print device. A time to failure may be measured in time, meter reads and/or the like.

Figure 1:
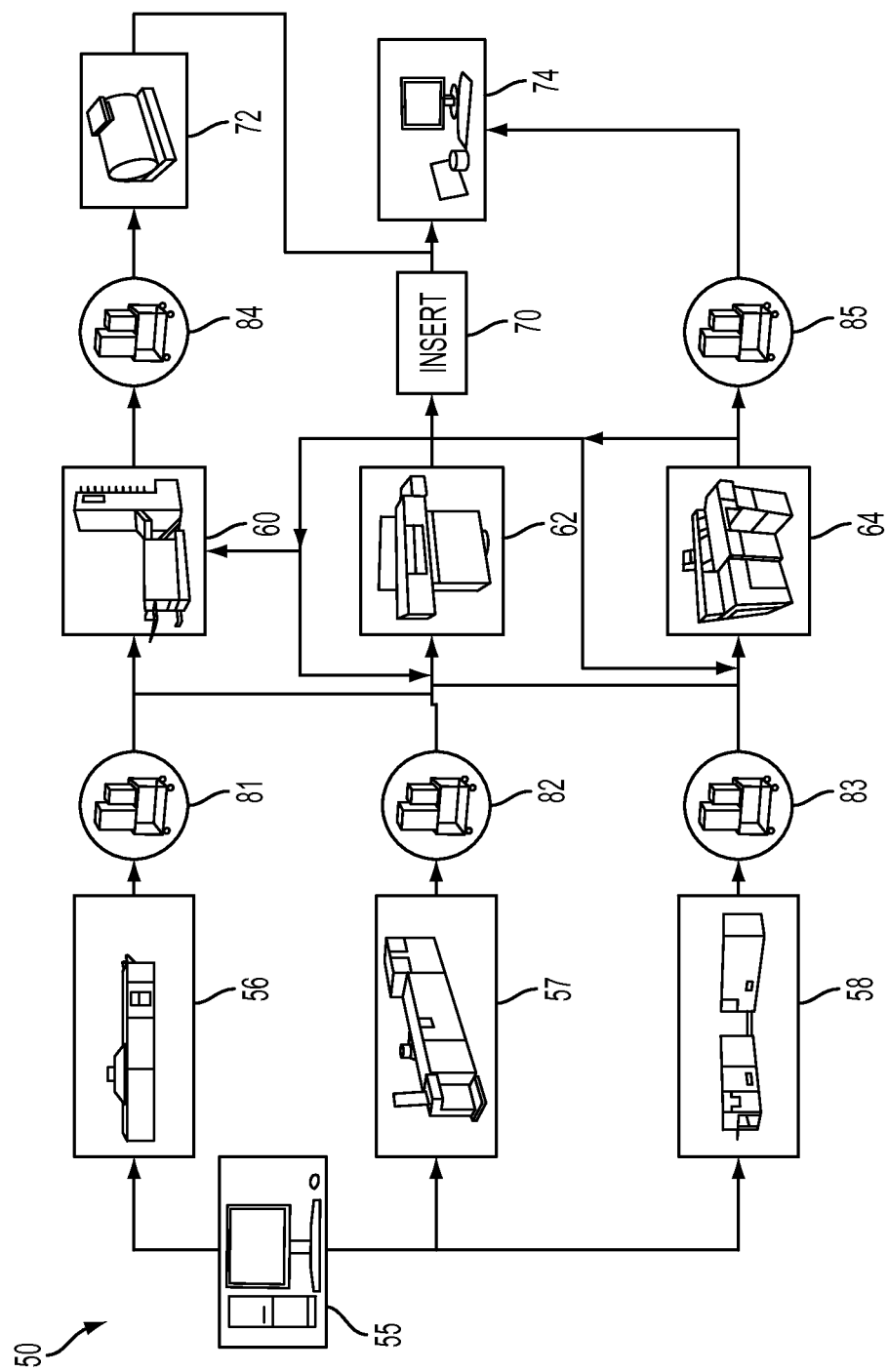
FIG. 1 illustrates a block diagram of a print shop according to an embodiment.

FIG. 1 shows an example of a print shop 50. Print jobs may enter the print shop manually or electronically and be collected at an electronic submission system 55, such as a computing device and/or scanner. Print jobs are sorted and batched at the submission system or another location, such as a workflow management system, before being delivered to one or more print engines, such as a color printer 56, black-and-white printer 57 and/or a continuous feed printer 58. Printed documents may exit the print engine and be delivered to one or more finishing devices or areas such as a collator 60, cutter 62 and/or binder 64. The finishing areas may include automatic or manual areas for such finishing activities, and they also may include an automatic or manual inserter 70. Finally, the documents may move to a postage metering station 72 and/or shipping station 74. Documents for print jobs may move from one location to another in the print shop by automatic delivery or manual delivery, such as by hand or by one or more paper carts 81-85.

Different elements of a print shop 50 may require setup time in order to prepare the device to process a particular print job. For example, some print jobs use pre-printed forms, such as bank statements that are pre-printed with the bank's logo and contact information or credit card statements pre-printed with charge dispute procedures. Forms also may include inserts, such as marketing materials or subscription cards. If a device in a print shop receives two consecutive print jobs that use identical forms, little or no changeover is required between the two print jobs. However, if the forms are different, the print jobs have different setup characteristics, and a significant setup time may be required to load the new form into the device. This is especially noticeable in continuous feed printing devices 58, where it can take up to 15 minutes or more to load a new form roll.

Figure 2:
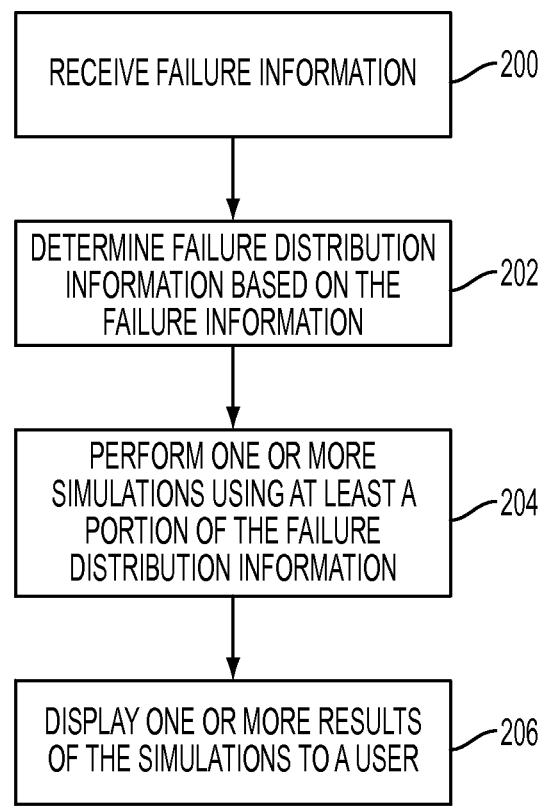
FIG. 2 illustrates a flow diagram of an illustrative method of analyzing the impact of one or more failures according to an embodiment.

FIG. 2 illustrates a flow diagram of an illustrative method of analyzing the impact of one or more failures according to an embodiment. As illustrated by FIG. 2, failure information for one or more print devices may be received 200. Failure information may include dates, times and/or causes of one or more failures encountered by one or more print devices. For example, failure information may include a time when the print device first encountered the failure, a time when the print device was repaired, a meter reading of the print device when it first encountered the failure, and one or more comments to, for example, explain the cause of the fault. Table 1 illustrates example failure information according to an embodiment.

TABLE 1

| Failure # | Date Failure Was Encountered | Time Failure Was Encountered | Date Device Was Fixed | Time Device Was Fixed | Meter Read | Repair Procedure | Comments |
|---|---|---|---|---|---|---|---|
| 1 | 11/6/210 | 15:00 | Nov. 6, 2010 | 21:43 | 1345689 | Normal | |
| 2 | Nov. 9, 2010 | 14:31 | Nov. 9, 2010 | 19:43 | 1398761 | Special | Storm caused delay in shipping parts |
| 3 | Nov. 14, 2010 | 2:10 | Nov. 14, 2010 | 6:12 | 1429011 | Normal | |
| 4 | Nov. 19, 2010 | 9:25 | Nov. 19, 2010 | 15:10 | 1489134 | Normal | |

In an embodiment, failure information may be obtained from one or more service logs associated with one or more print devices. A service log may be a record of actual service-related issues associated with one or more print devices. For example, a service log may be a record of service calls by technical service personnel in the field. FIG. 3 illustrates an example of a service log for a print device according to an embodiment.

In an embodiment, failure information may be received by a computing device from a print device. For example, a print device may send failure information to a computing device regularly, periodically and/or the like. In an embodiment, a print device may send failure information to a computing device in response to receiving a request for the failure information from the computing device.

In an alternate embodiment, a computing device may receive failure information from another computing device. For example, a first computing device may store failure information received from one or more print devices. A second computing device in communication with the first computing device may receive failure information from the first computing device. Additional and/or alternate arrangements may be used within the scope of this disclosure.

In an embodiment, the failure information that is received may be failure information corresponding to failures that occurred on a certain print device or devices. For example, received failure information may correspond to failures encountered by print devices in a certain print shop. As another example, received failure information may correspond to failures encountered by print devices operated by a certain customer, client or other operator.

In an embodiment, received failure information may correspond to failures that occurred over a period of time. For example, received failure information may correspond to faults that occurred on a certain day, over a certain period of days, with a certain number of weeks, months, years and/or the like. Additional and/or alternate time periods may be used within this disclosure.

In an embodiment, failure distribution information may be determined 202 based on the received failure information. Failure distribution information may be one or more metrics associated with failure information, such as, for example, a time to failure, a repair time and/or the like.

In an embodiment, a time to failure may be determined from failure distribution information for one or more failures in the failure data. A time to failure may be the amount of time between consecutive failures of a print device. For example, if a first failure occurs on a print device at 9 a.m. on a first day, and a second failure is experienced by the print device at 4 p.m. on the same day, the time to failure may be seven hours. In an embodiment, a time to failure may be measured in print shop open time, meaning that only time between consecutive failures during which a print shop is operational is measured. For example, a print shop may be operational between 8 a.m. and 5 p.m. on weekdays. If a first failure occurs at 3 p.m. on a Wednesday and a second failure occurs at 9 a.m. the following day, the time to failure may be three hours.

In an embodiment, a time to failure may be measured in terms of the number of meter reads between consecutive failures. As such, a time to failure may not be an amount of time, but rather a number of pages that a print device is able to process between consecutive failures. For example, referring back to Table 1, the time to failure between Failure 1 and Failure 2 may be 53,072 pages (i.e., 1,398,761-1,345,689). Measuring a time to failure in terms of the number of meter reads between consecutive failures may account for variability introduced by highly fluctuating demand. This may be especially true for situations where failures are experienced more when a print device is printing or processing more throughput.

In an embodiment, a repair time may be determined for one or more failures in the failure data. A repair time may refer to the amount of time between when a failure is first experienced by a print device and when the failure is repaired. For example, if a failure is experience by a print device at noon and the failure is repaired at 2 p.m. the same day, then the repair time is two hours. Table 2 illustrates examples of times between failures and repair times for the failures illustrated in Table 1.

TABLE 2

| Failure # | Time between Failures (hours) | Repair Time (hours:minutes) |
|---|---|---|
| 1 | N/A | 6:43 |
| 2 | 71.5 | 5:32 |
| 3 | 107.7 | 4:02 |
| 4 | 127.2 | 5:55 |

In an embodiment, one or more simulations may be performed 204 using at least a portion of the failure distribution information. A simulation may analyze the impact of one or more actual failures on the processing time of one or more theoretical or actual jobs. For example, one or more simulations may be performed 204 to determine whether a print shop is able to meet one or more processing deadlines. One or more simulations may be used to determine whether alternative scheduling policies, such as outsourcing jobs, should be considered. Simulations are described in more detail in, for example, at least U.S. Pat. No. 8,164,777 to Rai et al. entitled "Method and apparatus for modeling print jobs," U.S. Pat. No. 8,111,417 to Rai et al. entitled "Method and apparatus for modeling print jobs." Example simulations are described in, for example, Discrete-Event Simulation, 5/E; Jerry Banks, John S. Carson, II, Barry L. Nelson, David M. Nicol; Prentice Hall 2010.

In an embodiment, certain failure information or data points may be excluded from a simulation. Failure information that is unique to a special failure or event may be excluded. For example, a failure caused by a delay in the arrival of a part because of a hurricane may be considered a special case and excluded from the simulation. In an embodiment, failure information that is to be excluded from a simulation may be identified by a user. For example, a user may select one or more failure data points to exclude from a simulation. A simulation may be performed 204 on the remaining data points.

In an embodiment, a simulation may be performed 204 by one or more computing devices. The computing device may identify one or more parameters associated with a simulation, and, in an embodiment, one or more parameters may be provided to a user. For example, one or more parameters and associated values may be displayed to a user. In another embodiment, one or more parameters and corresponding values may be emailed or otherwise sent to a user.

In an embodiment, a comparison of parameters and parameter values of two or more simulations may be provided to a user. For example, a first simulation may be performed that does not take any failures into account. A second simulation may be performed which incorporates one or more failures. One or more parameters and parameter values for each of the two simulations may be presented to a user so that the user can compare the parameter values relative to the simulations.

The following examples illustrate two simulations that may be performed to analyze the impact of one or more failures on print shop processing times according to an embodiment. The simulations are performed using a print shop having three autonomous cells with one autonomous cell having a color continuous feed printer. In one simulation, the print shop is modeled without taking into account any failures. In the other simulation, the print shop is modeled taking into account failures. In this example, the simulation uses a mean time between failures of 15 hours and a mean repair time of 4 hours. However, additional and/or alternate times between failures, mean times between failures, repair times and/or mean repair times may be used within the scope of this disclosure.

Table 3 illustrates example print shop performance metrics for each simulation according to an embodiment. As illustrated by Table 3, Simulation 1 predicts only 23 late jobs, while Simulation 2 predicts 77 late jobs. As such, incorporating failures into a simulation may result in the prediction of many more late jobs than a simulation that does not take failures into account.

TABLE 3

| Parameter | Performance Metric - Simulation 1 (failure not modeled) | Performance Metric - Simulation 2 (failure modeled) |
|---|---|---|
| General | | |
| Scheduling policy | EarliestDue | EarliestDue |
| SubSequencing | No | No |
| Number of cells | 4 | 4 |
| Batching | Yes (batch limit: 0) | Yes (batch limit: 0) |
| Operator limited | No | No |
| Started on | Nov. 6, 2011 3:09:22 PM | Nov. 6, 2011 3:13:10 PM |
| Finished on | Nov. 6, 2011 3:09:27 PM | Nov. 6, 2011 3:13:15 PM |
| Elapsed time (s) | 5 | 5 |
| Simulation start | May 2, 2011 12:10:00 AM | May 2, 2011 12:10:00 AM |
| Simulation end | Jun. 3, 2011 8:44:43 AM | Jun. 3, 2011 8:44:43 AM |
| Makespan (h) | 776.58 | 776.58 |
| Lateness | | |
| Number of jobs | 3106 | 3106 |
| Number of jobs completed | 3106 | 3106 |
| Number of late jobs | 23 | 77 |
| Number of late jobs (percent) | 0.74 | 2.48 |
| Average lateness | −58.46 | −56.67 |
| Median lateness | −57.51 | −57.00 |
| Standard deviation lateness | 29.01 | 31.22 |
| Average lateness (late jobs only) | 8.09 | 25.55 |
| Maximum lateness | 18.14 | 63.17 |
| Performance | | |
| Average process cycle efficiency (PCE) (percent) | 17.46 | 16.79 |
| Median PCE (percent) | 2.08 | 1.86 |
| Average turnaround time (TAT) | 18.89 | 20.68 |
| Median TAT | 10.38 | 11.14 |
| Average slowdown | 0.56 | 0.61 |
| Median slowdown | 0.04 | 0.04 |
| Average value added time (VAT) | 1.34 | 1.34 |
| Median VAT | 0.11 | 0.11 |
| Average processing time | 8.76 | 8.86 |

Figure 4:
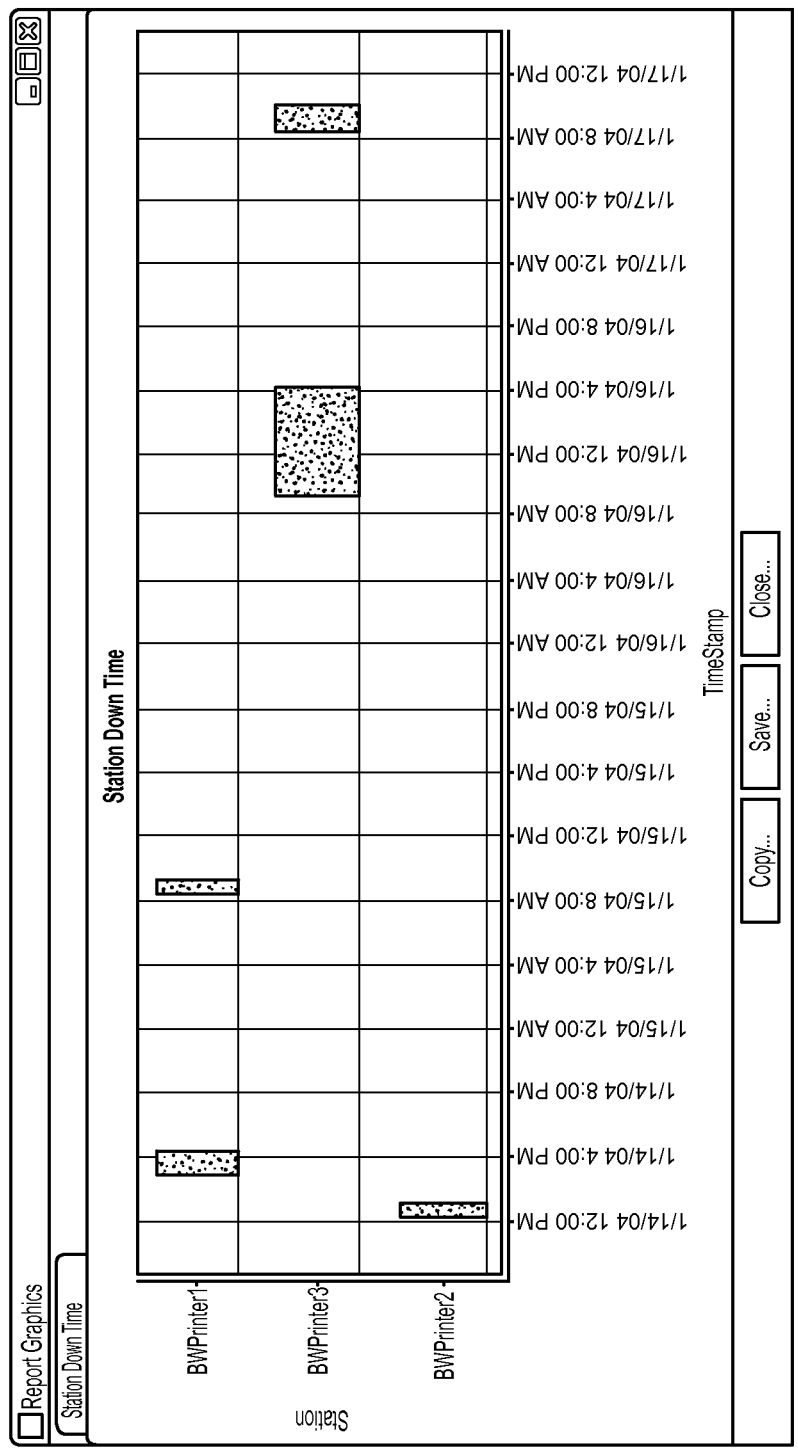
FIG. 4 illustrates an example graphical representation showing the periods of downtime experienced by example print devices over a period of time according to an embodiment.

In an embodiment, one or more results of one or more simulations may be displayed 206 to a user. In an embodiment, at least a portion of the results may be displayed as one or more graphical representations of the impact of failures on a print shop's productivity. A graphical representation may be a chart, a graph, a table or other visualization. For example, FIG. 4 illustrates an example graphical representation showing the periods of downtime experienced by example print devices over a period of time according to an embodiment. The illustrated periods of downtime may reflect the times during which the corresponding print devices experience a failure.

Figure 5:
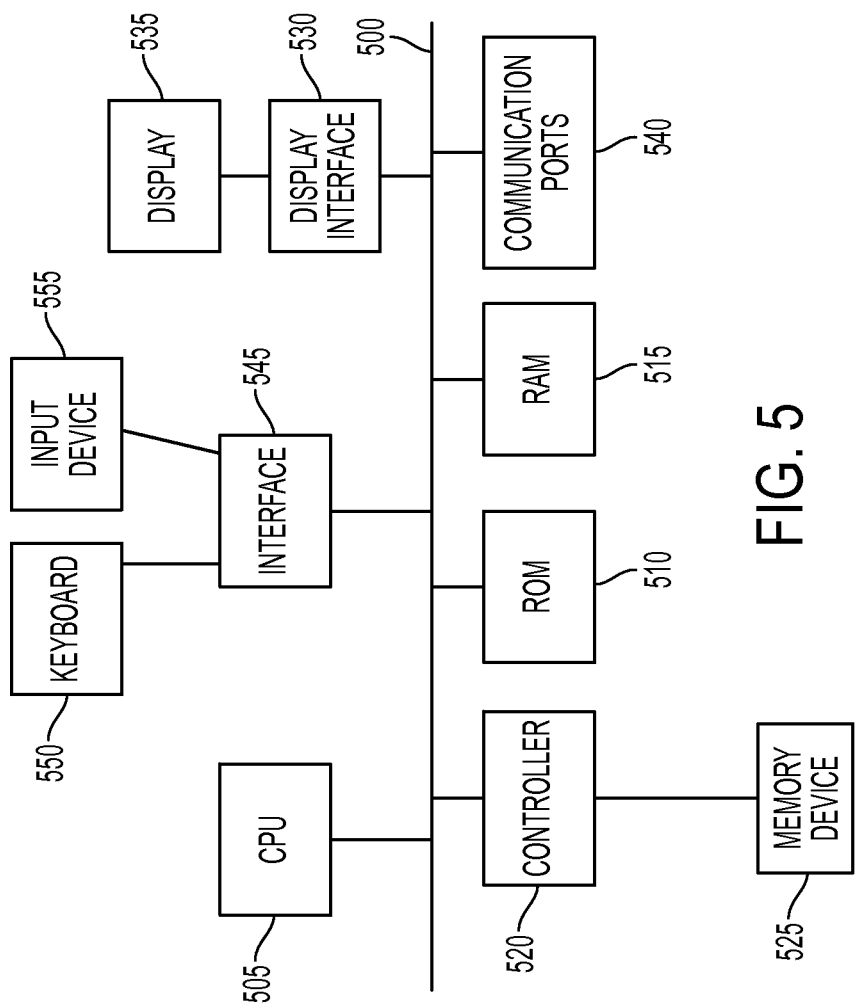
FIG. 5 illustrates a block diagram of hardware that may be used to contain or implement program instructions according to an embodiment.

FIG. 5 depicts a block diagram of hardware that may be used to contain or implement program instructions. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an example of a processing device, computing device or processor as such terms are used within this disclosure. Read only memory (ROM) 510 and random access memory (RAM) 515 constitute examples of memory devices.

A controller 520 interfaces with one or more optional memory devices 525 to the system bus 400. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 530 may permit information from the bus 500 to be displayed on the display 535 in audio, visual, graphic or alphanumeric format. Communication with external devices, such as a printing device, may occur using various communication ports 540. A communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of analyzing failures of a print device, the method comprising:
   receiving failure information associated with a print device in a print shop, wherein the failure information pertains to a plurality of failures experienced by the print device over a period of time;
   generating, by a computing device, failure distribution information by:
      identifying a plurality of pairs of consecutive failures experienced by the print device from the failure information,
      for each identified pair of consecutive failures:
         determining a time to failure between the failures in the identified pair of consecutive failures, and
         determining a repair time associated with each failure in the identified pair of consecutive failures, and
         setting the determined times to failure and the determined repair times as the failure distribution information;
   performing, by the computing device, a simulation of processing of one or more print jobs by the print device using the failure distribution information;
   performing a second simulation of the one or more print jobs by the print device, wherein the second simulation does not use the failure distribution information; and
   displaying a comparison of one or more parameter values of the simulation and the second simulation to a user, wherein the comparison comprises one or more graphical representations of an impact of the failure information on the print shop's productivity.

2. The method of claim 1, wherein receiving the failure information comprises receiving failure information from a service log associated with the print device.

3. The method of claim 1, wherein receiving the failure information comprises receiving failure information from the print device.

4. The method of claim 1, wherein determining a time to failure between the failures in the identified pair of consecutive failures comprises:
- identifying a first time associated with a first failure from the identified pair of consecutive failures;
- identifying a second time associated with a second failure from the identified pair of consecutive failures;
- determining an amount of time that has elapsed between the first time and the second time; and
- selecting the determined amount of time as the time to failure.

5. The method of claim 1, wherein determining a time to failure between the failures in the identified pair of consecutive failures comprises:
- identifying a first time associated with a first failure from the identified pair of consecutive failures;
- identifying a second time associated with a second failure from the identified pair of consecutive failures;
- determining an elapsed time by determining an amount of time that elapsed between the first time and the second time;
- identifying an amount of time between the first time and the second time during which the print shop was not operational;
- determining a difference value by subtracting the amount of time from the elapsed time; and
- selecting the difference value as the time to failure.

6. The method of claim 1, wherein determining a time to failure between the failures in the identified pair of consecutive failures comprises:
- identifying a first meter read value associated with a first failure from the identified pair of consecutive failures;
- identifying a second meter read value associated with a second failure from the identified pair of consecutive failures;
- determining a difference between the second meter read value and the first meter read value; and
- selecting the difference as the time to failure.

7. The method of claim 1, wherein determining a repair time associated with each failure comprises:
- determining a time at which the failure is first experienced by the print device;
- determining a time at which the failure is repaired;
- determining a difference between the time at which the failure is first experienced by the print device and the time at which the failure is repaired; and
- selecting the difference as the repair time.

8. The method of claim 1, wherein performing a simulation of processing of one or more print jobs by the print device using the failure distribution information comprises:
- identifying one or more data points from the received failure information to exclude from the simulation; and
- performing the simulation on the failure information that does not include the identified data points.

9. A system of analyzing failures of a print device, the system comprising:
- a computing device; and
- a non-transitory computer-readable storage medium in communication with the computing device, wherein the computer-readable storage medium comprises one or more programming instructions that, when executed, cause the computing device to:
  - receive failure information associated with a print device in a print shop, wherein the failure information pertains to a plurality of failures experienced by the print device over a period of time,
  - generate failure distribution information by:
    - identifying a plurality of pairs of consecutive failures experienced by the print device from the failure information,
    - for each identified pair of consecutive failures:
      - determining a time to failure between the failures in the identified pair of consecutive failures, and
      - determining a repair time associated with each failure in the identified pair of consecutive failures, and
    - setting the determined times to failure and the determined repair times as the failure distribution information;
  - perform a simulation of processing of one or more print jobs by the print device using the failure distribution information,
  - perform a second simulation of the one or more print jobs by the print device, wherein the second simulation does not use the failure distribution information, and
  - display a comparison of one or more parameter values of the simulation and the second simulation to a user, wherein the comparison comprises one or more graphical representations of an impact of the failure information on the print shop's productivity.

10. The system of claim 9, wherein the one or more programming instructions that, when executed, cause the computing device to receive the failure information comprise one or more programming instructions that, when executed, cause the computing device to receiving failure information from a service log associated with the print device.

11. The system of claim 9, wherein the one or more programming instructions that, when executed, cause the computing device to receive the failure information comprise one or more programming instructions that, when executed, cause the computing device to receive failure information from the print device.

12. The system of claim 9, wherein the one or more programming instructions that, when executed, cause the computing device to determine a time to failure between the failures in the identified pair of consecutive failures comprise one or more programming instructions that, when executed, cause the computing device to:
- identify a first time associated with a first failure from the identified pair of consecutive failures;
- identify a second time associated with a second failure from the identified pair of consecutive failures;
- determine an amount of time that has elapsed between the first time and the second time; and
- select the determined amount of time as the time to failure.

13. The system of claim 9, wherein the one or more programming instructions that, when executed, cause the computing device to determine a time to failure between the failures in the identified pair of consecutive failures comprise one or more programming instructions that, when executed, cause the computing device to:
- identify a first time associated with a first failure from the identified pair of consecutive failures;
- identify a second time associated with a second failure from the identified pair of consecutive failures;

determine an elapsed time by determining an amount of time that elapsed between the first time and the second time;

identify an amount of time between the first time and the second time during which the print shop was not operational;

determine a difference value by subtracting the amount of time from the elapsed time; and select the difference value as the time to failure.

14. The system of claim 9, wherein the one or more programming instructions that, when executed, cause the computing device to determine a time to failure between the failures in the identified pair of consecutive failures comprise one or more programming instructions that, when executed, cause the computing device to:

identify a first meter read value associated with a first failure from the identified pair of consecutive failures;

identify a second meter read value associated with a second failure from the identified pair of consecutive failures;

determine a difference between the second meter read value and the first meter read value; and select the difference as the time to failure.

15. The system of claim 9, wherein the one or more programming instructions that, when executed, cause the computing device to determine a repair time associated with each failure comprise one or more programming instructions that, when executed, cause the computing device to:

determine a time at which the failure is first experienced by the print device;

determine a time at which the failure is repaired;

determine a difference between the time at which the failure is first experienced by the print device and the time at which the failure is repaired; and select the difference as the repair time.

16. The system of claim 9, wherein the one or more programming instructions that, when executed, cause the computing device to perform a simulation of processing of one or more print jobs by the print device using the failure distribution information comprise one or more programming instructions that, when executed, cause the computing device to:

identify one or more data points from the received failure information to exclude from the simulation; and perform the simulation on the failure information that does not include the identified data points.

17. A method of analyzing failures of a plurality of print devices, the method comprising:

receiving failure information associated with a plurality of print devices in a print shop, wherein the failure information pertains to a plurality of failures experienced by the print devices over a period of time;

generating, by a computing device, failure distribution information associated with each print device in the plurality of print devices by:

identifying a plurality of pairs of consecutive failures experienced by the print device from the failure information, for each identified pair of consecutive failures:

determining a time to failure between the failures in the identified pair of consecutive failures, and determining a repair time associated with each failure in the identified pair of consecutive failures, and setting the determined times to failure and the determined repair times as the failure distribution information;

performing, by the computing device, a simulation of processing of one or more print jobs by the print devices using the failure distribution information associated with the print devices;

performing a second simulation of the one or more print jobs by the print device, wherein the second simulation does not use the failure distribution information, and displaying a comparison of one or more parameter values of the simulation and the second simulation to a user, wherein the comparison comprises one or more graphical representations of an impact of the failure information on the print shop's productivity.

\* \* \* \* \*